UNITED STATES PATENT OFFICE.

JOHN G. JARVIS, OF STAMFORD, NEW YORK.

PYROXYLIN SHEET OF LOW INFLAMMABILITY.

1,349,156.     Specification of Letters Patent.     Patented Aug. 10, 1920.

No Drawing.     Application filed March 13, 1919. Serial No. 282,440.

*To all whom it may concern:*

Be it known that I, JOHN G. JARVIS, a citizen of the United States, residing at Stamford, in the county of Delaware and State of New York, have invented certain new and useful Improvements in Pyroxylin Sheets of Low Inflammability; and I do hereby declare the following to be a full, clear, and exact description of the invention, such as will enable others skilled in the art to which it appertains to make and use the same.

This invention relates to new and useful improvements in method of making acetyl cellulose compositions.

I have discovered that acetone cinchonine or sulfate of cinchonine when added to an acetyl cellulose mixture will give permanent strength and tenacity to the product.

The proportions of the foregoing may be 100 parts of acetyl cellulose to 2 parts of acetone cinchonine. It will be understood, however, that these proportions may be varied somewhat, depending upon the quality of acetyl cellulose.

The foregoing process, I have found, will be particularly useful in making strong films, the treatment of the acetyl cellulose arresting any tendency to decomposition and effectually preventing deterioration, the product being strong, tenacious and maintaining its characteristics with age or any amount of handling.

The film produced by my improved method will be free from brittleness and retain its strength for an indefinite time.

What I claim to be new is:

A composition of matter containing acetyl cellulose compound, in combination with acetone cinchonine and its salts.

In testimony whereof I hereunto affix my signature in presence of two witnesses.

JOHN G. JARVIS.

Witnesses:
F. J. R. CLARKE,
LILLIAN A. WOLF.